(12) United States Patent
Umeya

(10) Patent No.: US 7,075,598 B2
(45) Date of Patent: Jul. 11, 2006

(54) CIRCULARLY POLARIZING ELEMENT HAVING MULTIPLE LOW REFLECTANCE CHOLESTERIC LIQUID CRYSTAL LAYERS AND PROCESS FOR PRODUCING THE SAME

(75) Inventor: Masanori Umeya, Shinjuku-Ku (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 96 days.

(21) Appl. No.: 10/385,491

(22) Filed: Mar. 12, 2003

(65) Prior Publication Data

US 2003/0174276 A1    Sep. 18, 2003

(30) Foreign Application Priority Data

Mar. 12, 2002  (JP) ............................. 2002-067058

(51) Int. Cl.
*G02F 1/1335* (2006.01)

(52) U.S. Cl. ........................... 349/98; 349/96; 349/115; 359/500

(58) Field of Classification Search ................. 349/96, 349/97, 98, 194, 115; 359/490, 498–500
See application file for complete search history.

(56) References Cited

U.S. PATENT DOCUMENTS

| | | | |
|---|---|---|---|
| 4,410,570 A | 10/1983 | Kreuzer et al. | 427/374.1 |
| 5,506,704 A * | 4/1996 | Broer et al. | 349/98 |
| 5,691,789 A | 11/1997 | Li et al. | 349/98 |
| 5,798,147 A | 8/1998 | Beck et al. | 427/511 |
| 6,061,108 A * | 5/2000 | Anderson et al. | 349/98 |
| 6,252,640 B1 * | 6/2001 | Kim et al. | 349/96 |
| 2001/0003473 A1 * | 6/2001 | Galabova et al. | 349/98 |

FOREIGN PATENT DOCUMENTS

| | | |
|---|---|---|
| JP | 57-165480 | 10/1982 |
| JP | 6-281814 | 10/1994 |
| JP | 7-258638 | 10/1995 |
| JP | 9-133810 | 5/1997 |
| JP | 10-508882 | 9/1998 |
| JP | 11-44816 | 2/1999 |
| JP | 11-293252 | 10/1999 |
| JP | 3062150 | 4/2000 |
| JP | 2001-318234 | 11/2001 |

* cited by examiner

*Primary Examiner*—Andrew Schechter
*Assistant Examiner*—Michael H. Caley
(74) *Attorney, Agent, or Firm*—Oliff & Berridge, PLC (57) ABSTRACT

A circularly polarizing element is a laminate of n number of cholesteric liquid crystal layers that are laminated so that the helical axis in each liquid crystal layer extends in the direction of thickness, where liquid crystalline molecules in the cholesteric liquid crystal layers spiral in the same direction to form helixes. The cholesteric liquid crystal layers are wide-wave-range-covering liquid crystal layers adapted to selectively reflect circularly polarized light in wide wave ranges, and these selective reflection wave ranges overlap one another over a specified wide range. Each cholesteric liquid crystal layer is a single layer in which the helical pitch is varied in the direction of thickness so that the layer can selectively reflect circularly polarized light in a broadened wave range, and preferably covers a wave range of 200 nm or more. This circularly polarizing element is excellent in the alignment of liquid crystalline molecules and in optical properties, and has an easily and stably controlled reflectance/transmittance for circularly polarized light.

8 Claims, 5 Drawing Sheets

CIRCULARLY POLARIZING ELEMENT HAVING MULTIPLE LOW REFLECTANCE CHOLESTERIC LIQUID CRYSTAL LAYERS AND PROCESS FOR PRODUCING THE SAME

BACKGROUND OF THE INVENTION

1. Field of the Invention

The present invention relates to an optical element for use in a display such as a liquid crystal display, more particularly, a circularly polarizing element including cholesteric liquid crystal layers, and to a process for producing the same. The term "liquid crystal layer" as used herein means a layer having the nature of liquid crystal in an optical sense, and includes not only a layer of a liquid crystalline phase having flowability but also a layer of a solid phase obtainable by solidifying a liquid crystalline phase with the orientation of molecules in the liquid crystalline phase maintained.

2. Description of Related Art

There has conventionally been known a circularly polarizing element including a cholesteric liquid crystal layer, capable of reflecting either right- or left-handed circularly polarized component of light of a wavelength equal to the pitch of a helix formed by liquid crystalline molecules in the liquid crystal layer and transmitting the other circularly polarized component of the light. In such a circularly polarizing element, a method in which the helical pitch in the single liquid crystal layer is continuously varied in the direction of thickness has been known as a technique for broadening the selective reflection wave range that is covered by the circularly polarized element (Japanese Laid-Open Patent Publication No. 281814/1994, etc.). Other known methods useful for this purpose are as follows: a method in which a plurality of liquid crystal layers having different helical pitches are laminated (Japanese Patent Application No. 56916/2001); and a method in which, after laminating two cholesteric liquid crystalline polymer layers by contact bonding, the helical pitches in the layers are varied stepwise through heat treatment (Japanese Laid-Open Patent Publication No. 44816/1999).

Figure 6:
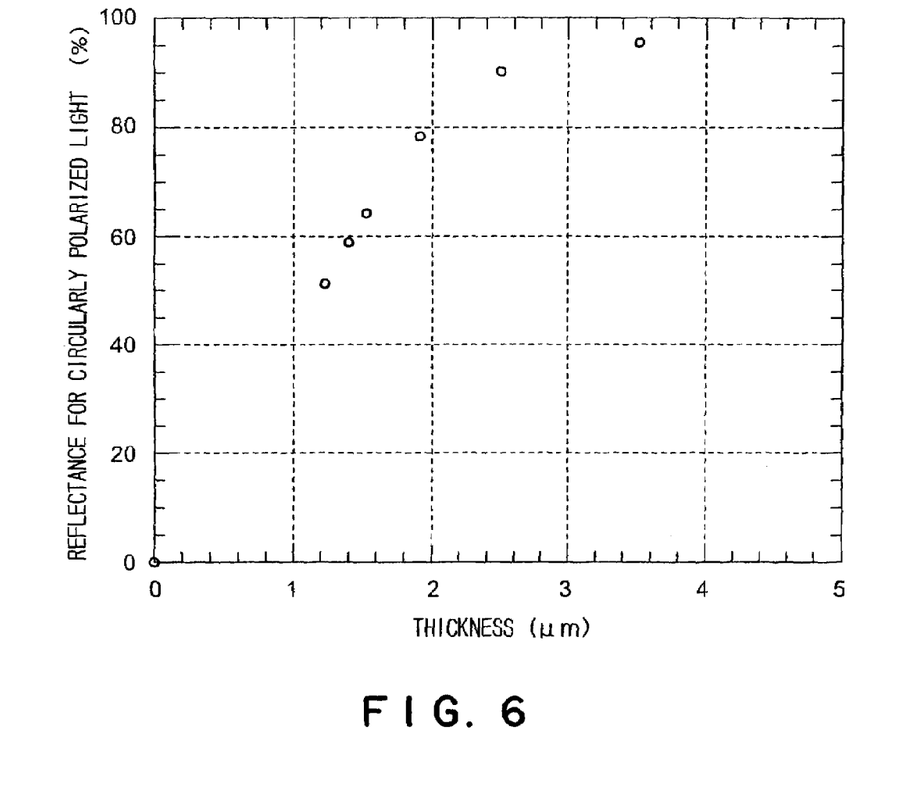
FIG. 6 is a graph showing the relationship between the reflectance of a cholesteric liquid crystal layer for circularly polarized light and the thickness of the liquid crystal layer.

In the above-described circularly polarizing element, in order to make the reflectance of the circularly polarizing element for circularly polarized light high, it is necessary to make the liquid crystal layer sufficiently thick. It is noted that there is a definite relationship between the reflectance of a liquid crystal layer for circularly polarized light and the thickness of the liquid crystal layer. For example, in the reflection of circularly polarized green light (central wavelength: 520 nm) by a cholesteric liquid crystal layer with a refractive index n of 1.56, the relationship between the reflectance of the liquid crystal layer for the circularly polarized light and the thickness of the liquid crystal layer is as shown in FIG. 6. As can be understood from this figure, in order to make the reflectance of the liquid crystal layer for the circularly polarized light as high as 90% or more, the liquid crystal layer is required to have a thickness of approximately 2.5 µm.

To make a cholesteric liquid crystal layer reflect approximately 90% of circularly polarized light of a certain wavelength, it is, in general, necessary that 7 to 8 helical pitches be present in the liquid crystal layer in the direction of thickness. One pitch corresponds to the distance it takes for liquid crystalline molecules to rotate through 360°. Therefore, the thickness required for a liquid crystal layer to reflect approximately 90% of circularly polarized light of a certain wavelength is given by the following Eq. (1), using the wavelength of the circularly polarized light and the refractive index of the cholesteric liquid crystal layer:

$$\text{(Thickness of liquid crystal layer)} = 8 \text{ pitches} \times \text{(Wavelength of circularly polarized light)} \div \text{(Refractive index of cholesteric liquid crystal layer)} \quad (1)$$

In the case where a circularly polarizing element having a high reflectance for circularly polarized light over the whole visible light range (e.g., 400–700 nm) is obtained by using, as a technique for broadening selective reflection wave range, a method in which the helical pitch in a single liquid crystal layer is continuously varied in the direction of thickness, it is necessary to make the thickness of the liquid crystal layer several tens micrometers (e.g., 20µm or more). In general, if a liquid crystal layer has a surface area of (100 mm×100 mm) or more, it is necessary to make its thickness approximately 10µm, more preferably 5 µm or less, in order to ensure good alignment of liquid crystalline molecules over the entire surface of the liquid crystal layer with such a large surface area. This is because if the liquid crystal layer is too thick, it is apt to have an alignment defect called "oily streak" and to suffer from focal conic. If such troubles are caused, the liquid crystal layer becomes opaque, for example, and its optical properties thus remarkably deteriorate.

On the other hand, in the case where a circularly polarizing element is obtained by using, as a technique for broadening selective reflection wave range, a method in which a plurality of liquid crystal layers having different helical pitches are laminated, that is, a method in which a plurality of liquid crystal layers respectively covering any narrow selective reflection wave ranges on the short to long wavelength side, are laminated, each liquid crystal layer is made to have a thickness of several micrometers. It is, however, necessary to make those liquid crystal layers that cover wave ranges on the longer wavelength side thicker, so that above-described troubles tend to occur. Moreover, in this method, the compositions of coating liquids for forming the liquid crystal layers are different, and the conditions under which the liquid crystal layers are formed are also different. Therefore, it is not easy to stably control the reflectance/transmittance of the resulting circularly polarizing element for circularly polarized light.

SUMMARY OF THE INVENTION

The present invention was accomplished in view of the above drawbacks in the related art. An object of the present invention is therefore to provide a circularly polarizing element that is excellent in the alignment of liquid crystalline molecules and in optical properties and can have an easily and stably controlled reflectance/transmittance for circularly polarized light, and a process for producing such a circularly polarizing element.

A first aspect of the present invention is a circularly polarizing element comprising: at least two cholesteric liquid crystal layers that are laminated to each other so that the helical axis in each liquid crystal layer extends in the direction of thickness, wherein all the cholesteric liquid crystal layers are wide-wave-range-covering liquid crystal layers adapted to selectively reflec circularly polarized light in wide wave ranges, and the selective reflection wave ranges of the wide-wave-range-covering liquid crystal layers overlap one another over a specified wide range.

In the above-described first aspect of the present invention, each wide-wave-range-covering liquid crystal layer is preferably a single layer in which the helical pitch of each helix formed by liquid crystalline molecules is continuously varied in the direction of thickness so that the liquid crystal layer can selectively reflect circularly polarized light in a broadened wave range. Alternatively, a plurality of liquid crystal layers having different helical pitches may be laminated to obtain each wide-wave-range-covering liquid crystal layer as a laminate so that the laminate can selectively reflect circularly polarized in a broadened wave range. It is also preferable that each wide-wave-range-covering liquid crystal layer covers a wave range of 200 nm or more. Moreover, it is preferable that all the liquid crystal layers be substantially the same. The expression "substantially the same" herein means that the difference between any two of the liquid crystal layers in the reflectance for circularly polarized light, that in the thickness, and that in the selective reflection wave range are all within ±5%.

A second aspect of the present invention is a circularly polarizing element comprising: at least two cholesteric liquid crystal layers that are laminated to each other so that the helical axis in each liquid crystal layer extends in the direction of thickness, wherein the helical pitch of each helix formed by liquid crystalline molecules in each liquid crystal layer is varied so that the liquid crystal layer can selectively reflect circularly polarized light in a broadened wave range.

In the above-described second aspect of the present invention, it is preferable that the helical pitch in each liquid crystal layer monotonically varies from short to long and that each two adjacent liquid crystal layers be laminated so that the direction of the change in helical pitch in one liquid crystal layer is, in terms of the direction of thickness, opposite to that of the change in helical pitch in the other liquid crystal layer. Alternatively, each two adjacent liquid crystal layers may be laminated so that the direction of the change in helical pitch in one liquid crystal layer is, in terms of the direction of thickness, the same as that of the change in helical pitch in the other liquid crystal layer. The expression "monotonically varies" herein means that the helical pitch increases or decreases in the direction of thickness with a definite tendency, and includes not only monotonic changes (monotonic increase and decrease) in a strict sense but also stepwise increase and decrease.

A third aspect of the present invention is a process for producing a circularly polarizing element, comprising the steps of: forming, on a substrate, a single wide-wave-range-covering liquid crystal layer adapted to selectively reflect circularly polarized light in a wide wave range as an original layer; cutting up the original layer into a plurality of wide-wave-range-covering liquid crystal layers; and laminating any number of the wide-wave-range-covering liquid crystal layers to obtain a circularly polarizing element having a desired reflectance or transmittance for circularly polarized light.

According to the present invention, a circularly polarizing element having a high reflectance for circularly polarized light is produced by laminating a plurality of liquid crystal layers, each layer being able to selectively reflect circularly polarized light in a wide wave range. Therefore, even a circularly polarizing element that covers a wide selective reflection wave range can be obtained as a laminate of thin liquid crystal layers, each having a low reflectance for circularly polarized light. Since a thin liquid crystal layer is advantageous in that the alignment of liquid crystalline molecules can easily be controlled on the formation of the layer, the circularly polarizing element finally obtained by laminating thin liquid crystal layers is excellent in the alignment of liquid crystalline molecules and also in optical properties. Further, in the present invention, if the liquid crystal layers are formed by using one coating liquid under the same conditions, it is possible to control easily and stably the reflectance/transmittance of the resulting circularly polarizing element for circularly polarized light.

DETAILED DESCRIPTION OF PREFERRED EMBODIMENTS

By referring to the accompanying drawings, embodiments of the present invention will be described hereinafter.

Figure 1:
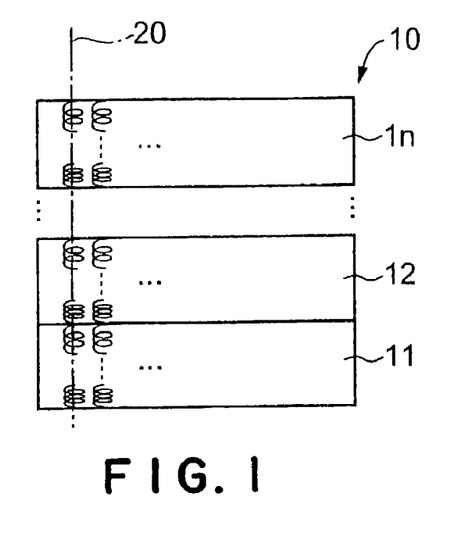
FIG. 1 is a diagrammatic view showing an embodiment of the circularly polarizing element according to the present invention.

As shown in FIG. 1, a circularly polarizing element 10 according to the embodiment of the invention is a laminate of n number of cholesteric liquid crystal layers 11, 12, . . . and 1n. These cholesteric liquid crystal layers 11, 12, . . . , and 1n are laminated so that the helical axis 20 in each liquid crystal layer extends in the direction of thickness. Further, liquid crystalline molecules in the cholesteric liquid crystal layers 11, 12, . . . , and 1n spiral in the same direction to form helixes.

Liquid crystalline molecules in each liquid crystal layer 11, 12, . . . , or 1n takes, as a physical molecular orientation, helical structure in which the director continuously rotates in the direction of thickness. Owing to such a physical orientation of liquid crystalline molecules, each liquid crystal layer has the polarized-light-separating property; that is, the property of separating a component circularly polarized in one direction from a component circularly polarized in the opposite direction. Namely, natural light entering into each liquid crystal layer 11, 12, . . . , or 1n along the helical axis 20 is split into two circularly polarized components, right-handed circularly polarized component and left-handed circularly polarized component; one of these components is transmitted and the other one is reflected. This phenomenon is known as circular dichroism. If the direction of rotation of the director in the helical structure is properly selected, the component circularly polarized in the same direction as this direction of rotation is selectively reflected.

In this case, the scattering of rotated light becomes maximum at the wavelength $\lambda_0$ defined by the following Eq. (2):

$$\lambda_0 = n_{av} \cdot p, \qquad (2)$$

where p is the helical pitch in the helical structure (the length corresponding to one pitch of the helix formed by liquid crystalline molecules), and nav is the mean refractive index on a plane perpendicular to the helical axis 20.

At this time, the width Δλ of the wave range in which the wavelength of reflected light falls is given by Eq. (3):

$$\Delta\lambda = \Delta n \cdot p, \quad (3)$$

where Δn is the index of double refraction.

Namely, with respect to natural light incident on each liquid crystal layer 11, 12, ..., or 1n, either right- or left-handed circularly polarized component of light in a wave range (selective reflection wave range) with a central wavelength $\lambda_0$ and a width Δλ is reflected owing to the above-described polarized-light-separating property, and the other circularly polarized component of the light and light (unpolarized light) not in this selective reflection wave range are transmitted. Upon reflection, the right- or left-handed circularly polarized component is reflected as it is without undergoing inversion of phase unlike in the case of ordinary reflection of light.

The liquid crystal layers 11, 12, ..., and 1n are wide-wave-range-covering liquid crystal layers adapted to selectively reflect circularly polarized light in wide wave ranges, and these selective reflection wave ranges overlap one another over a specified wide range. Each liquid crystal layer 11, 12, ..., or 1n is a single-layered liquid crystal layer in which the helical pitch of each helix formed by liquid crystalline molecules is continuously varied in the direction of thickness so that the liquid crystal layer can selectively reflect circularly polarized light in a broadened wave range. Alternatively, each liquid crystal layer 11, 12, ..., or 1n may be a multi-layered liquid crystal layer obtained by laminating a plurality of liquid crystal layers having different helical pitches so that the liquid crystal layer obtained as a laminate can selectively reflect circularly polarized light in a broadened wave range. It is preferable that each liquid crystal layer 11, 12, ..., or 1n covers a wave range of 200 nm or more, more preferably a visible light range of 400 to 700 nm. Moreover, it is preferable that the liquid crystal layers 11, 12, ..., and 1n be substantially the same. The expression "substantially the same" herein means that the difference between any two of the liquid crystal layers in the reflectance for circularly polarized light, that in the thickness, and that in the selective reflection wave range are all within ±5%.

The helical pitch in each liquid crystal layer 11, 12, ..., or 1n, whether the layer is a single- or multi-layered one as described above, varies monotonically from short to long. Strictly speaking, the change in helical pitch is continuous increase or decrease in a single-layered liquid crystal layer, and stepwise increase or decrease in a multi-layered liquid crystal layer. In this specification, however, both types of changes in helical pitch are collectively called "monotonic change". In this embodiment, the liquid crystal layers 11, 12, ..., and 1n, the helical pitch in each layer varying as mentioned above, are laminated in the following manner (1) or (2): (1) the liquid crystal layers 11, 12, ..., and 1n are laminated so that the direction of the change in helical pitch in one of each two adjacent liquid crystal layers is, in terms of the direction of thickness, opposite to that of the change in helical pitch in the other liquid crystal layer (see FIG. 2A); or (2) the liquid crystal layers 11, 12, ..., and 1n are laminated so that the direction of the change in helical pitch in one of each two adjacent liquid crystal layers is, in terms of the direction of thickness, the same as that of the change in helical pitch in the other liquid crystal layer (see FIG. 2B).

Figure 2A:
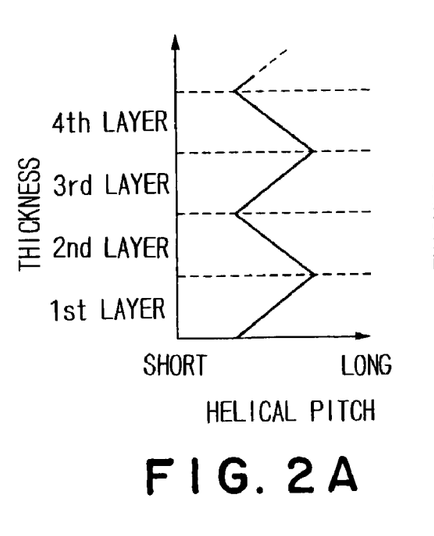
FIGS. 2A and 2B are views for illustrating the tendency of the change in helical pitch in the liquid crystal layers constituting the circularly polarizing element shown in FIG. 1.
Figure 2B:
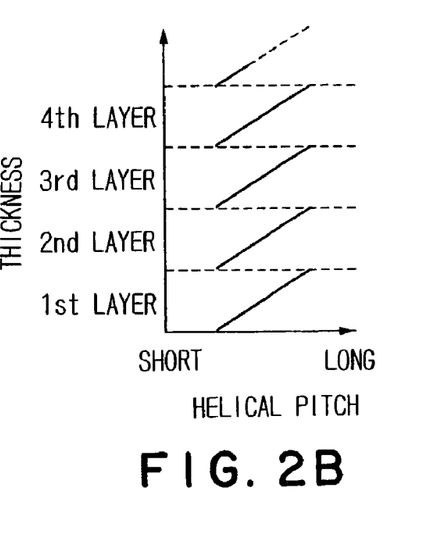

In the case of the above-described manner (1), if the helical pitch in the first liquid crystal layer 11 is varied from short to long, the helical pitch in the second crystal layer 12 is varied from long to short, and that in the third crystal layer 13, from short to long, as shown in FIG. 2A. In a circularly polarizing element 10 including liquid crystal layers 11, 12, ..., and 1n laminated in this manner, the difference in pitch length at the interface between each two adjacent liquid crystal layers is small (substantially the same in some cases). It is therefore possible to minimize interfacial reflection that is caused by the difference in refractive index or the like, and deterioration of optical properties that is attributed to the interfacial reflection can thus be prevented. In the case of the above manner (2), all the directions of the changes in helical pitch in the liquid crystal layers 11, 12, ..., and 1n are made the same (e.g., from short to long), as shown in FIG. 2B. In a circularly polarizing element 10 including liquid crystal layers 11, 12, ..., and 1n laminated in this manner, the long-pitch portions of the liquid crystal layers are to be dispersed in terms of the direction of thickness (in general, liquid crystalline molecules in a long-pitch portion are not well aligned, so that the resulting cholesteric structure is disordered). It is therefore possible to minimize disordering of alignment, and deterioration of optical properties that is attributed to the disordering of alignment can thus be prevented.

The thickness of each liquid crystal layer 11, 12, ..., or 1n is controlled so that liquid crystalline molecules can be well aligned over the entire surface of the liquid crystal layer. Namely, each liquid crystal layer 11, 12, ..., or 1n is formed as a thin film having a low reflectance for circularly polarized light. By laminating a plurality of such thin liquid crystal layers, a circularly polarizing element 10 having a high reflectance for circularly polarized light is produced. For instance, a circularly polarizing element 10 having a high reflectance of approximately 90% for circularly polarized light is obtained by laminating four wide-wave-range-covering liquid crystal layers, each having a thickness as thin as 5 μm and a low reflectance of approximately 55% for circularly polarized light.

In the case where each liquid crystal layer 11, 12, ..., or 1n is a single-layered one, its thickness is preferably 10 μm or less, more preferably 5 μm or less. As long as the thickness of each liquid crystal layer 11, 12, ..., or 1n falls in this range, good alignment of liquid crystalline molecules can be attained. Each liquid crystal layer 11, 12, ..., or 1n can have any small thickness as long as the layer can contribute to the broadening of selective reflection wave range, that is, as long as the helical pitch in the layer can vary in the direction of thickness. However, a minimum thickness of each liquid crystal layer is preferably 1 μm.

On the other hand, when each liquid crystal layer 11, 12, ..., or 1n is a multi-layered one, it can have any thickness. It is, however, preferable that the thickness of each liquid crystal layer, a constituent of each liquid crystal layer 11, 12, ..., or 1n, be 10 μm or less, more preferably 5 μm or less. Although there is no particular limitation on the total thickness of each liquid crystal layer 11, 12, ..., or 1n, it is proper to make this thickness 2 μm or more and 50 μm or less.

In the case where two liquid crystal layers having the same reflectance "a" for circularly polarized light are laminated, the total reflectance $R_2$ of the laminate for circularly polarized light can approximately be obtained by the following Eq. (4):

$$R_2 = 2a/(1+a). \quad (4)$$

For example, if two liquid crystal layers, each having a reflectance "a" of 0.4 (40%) for circularly polarized light, are laminated, the total reflectance $R_2$ of the laminate for circularly polarized light is 0.57 (57%), and when a=0.5 (50%), $R_2$=0.67 (67%). In this case, the of the laminate for circularly polarized light can be obtained by the equation $T_2$=1–$R_2$. In Equations (4), (5) and (6), "a", "$R_2$" and others are not percentages but values obtained by dividing percentages by 100.

Similarly, when k number of liquid crystal layers having the same reflectance "a" for circularly polarized light are laminated, the total reflectance $R_k$ of the laminate for circularly polarized light can approximately be obtained by the following Eq. (5):

$$R_k=ka/[1+(k-1)a]. \quad (5)$$

In this case, the transmittance $T_k$ of the laminate for circularly polarized light can be obtained by the equation $T_k$=1–$R_k$.

On the other hand, in the case where two liquid crystal layers having different reflectances "a", "a'" for circularly polarized light are laminated, the total reflectance $R_2'$ of the laminate for circularly polarized light can approximately be obtained by the following Eq. (6):

$$R_2'=(1-a)(1-a')/(1-aa'). \quad (6)$$

In this case, the transmittance $T_2'$ of the laminate for circularly polarized light can be obtained by the equation $T_2'$=1–$R_2'$.

The above Eq. (6) is also applicable to the case where one of two liquid crystal layers is a laminate of a plurality of liquid crystal layers. Therefore, by the combination use of Eq. (6) and Eq. (4) or (5), it is possible to obtain the reflectance (and transmittance) for circularly polarized light of a laminate of any number of liquid crystal layers, each having any reflectance for circularly polarized light.

It is thus possible to control, under the above Eqs. (4), (5) and (6), the total reflectance (and transmittance) of a circularly polarizing element 10 for circularly polarized light in the following manner. Namely, in the case where liquid crystal layers having the same reflectance for circularly polarized light are laminated to obtain a circularly polarizing element, it is possible to control the total reflectance of the circularly polarizing element for circularly polarized light (1) by appropriately selecting the reflectance of the liquid crystal layer (single layer) for circularly polarized light with the number of the liquid crystal layers to be laminated fixed, or (2) by changing the number of the liquid crystal layers to be laminated with the reflectance of the liquid crystal layer (single layer) for circularly polarized light fixed. Further, in the case where liquid crystal layers having different reflectances for circularly polarized light are laminated to obtain a circularly polarizing element, it is possible to control the total reflectance of the circularly polarizing element for circularly polarized light (3) by freely selecting the reflectances of the liquid crystal layers for circularly polarized light and laminating any number of the liquid crystal layers.

To form each liquid crystal layer 11, 12, . . . , or 1n, three-dimensionally crosslinkable, polymerizable monomers or oligomers can be used. For example, mixtures of liquid crystalline monomers and chiral compounds as described in Japanese Laid-Open Patent Publication No. 258638/1995 and Published Japanese Translation No. 508882/1998 of PCT International Publication can be used as polymerizable monomers, and cyclic organopolysiloxane cholesteric compounds as described in Japanese Laid-Open Patent Publication No. 165480/1982 can be used as polymerizable oligomers. By "three-dimensional crosslinking" is herein meant that polymerizable monomer or oligomer molecules are three-dimensionally polymerized to give a network structure. By forming such a network structure, it is possible to optically fix liquid crystalline molecules with their orientation in a liquid crystalline phase retained, and a liquid crystal film that is easy to handle as an optical film and is stable at normal temperatures can thus be obtained.

When a polymerizable monomer or oligomer is made into a liquid crystal layer at a predetermined temperature, the liquid crystal layer obtained is nematic. If any chiral agent is added, this nematic liquid crystal is transformed into chiral nematic (cholesteric) liquid crystal. Specifically, a chiral agent may be added to a polymerizable monomer or oligomer in an amount of several percents to 10% of the polymerizable monomer or oligomer. By varying the chiral power by changing the type of the chiral agent to be added, or by varying the concentration of the chiral agent, it is possible to control the selective reflection wave range to be covered by the resulting liquid crystal layer, which is determined by the cholesteric regularity of the polymerizable monomer or oligomer molecules in the liquid crystal layer.

Figure 3:
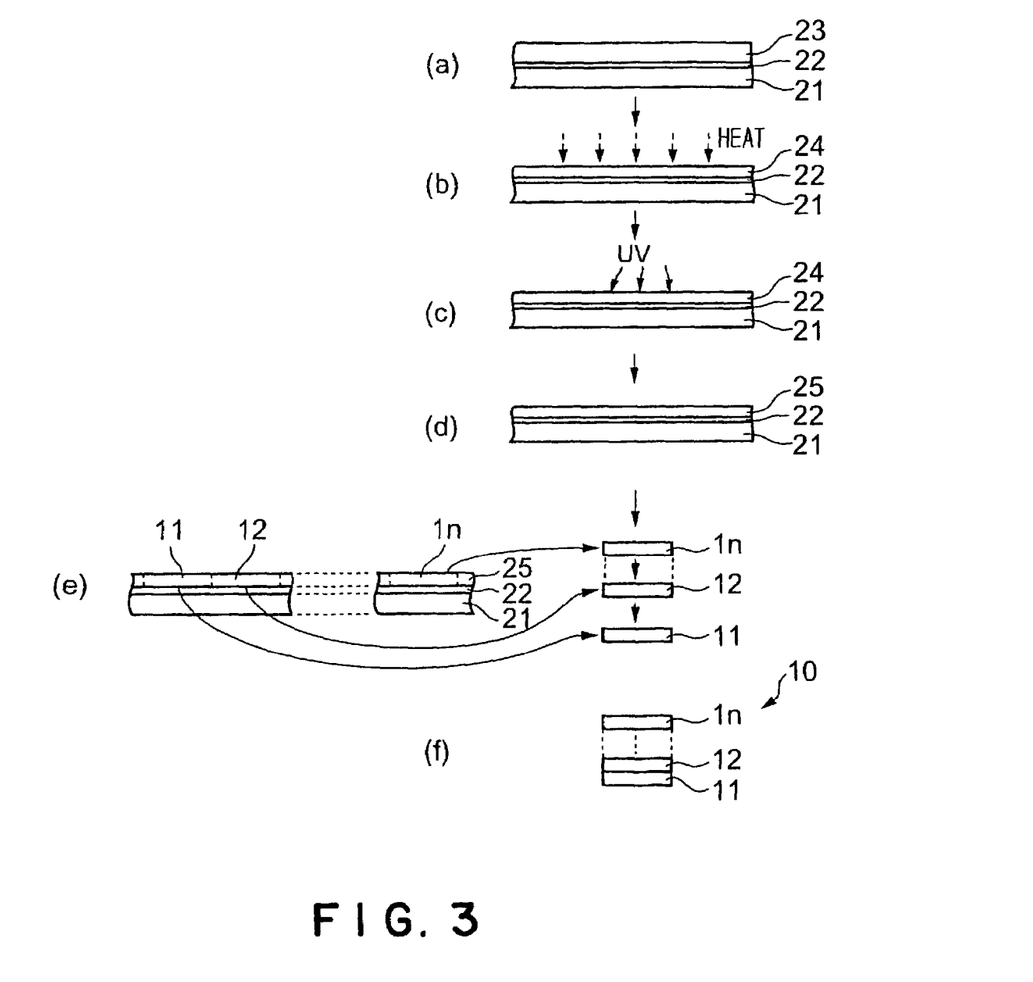
FIG. 3 is a view for illustrating an embodiment of the process for producing the circularly polarizing element shown in FIG. 1.

Next, a process for producing the circularly polarizing element 10 shown in FIG. 1 will be described by referring to FIG. 3.

As shown in FIG. 3(a), a glass substrate 21 provided with an alignment layer 22 made from polyimide or the like is firstly prepared, and a cholesteric liquid crystal solution 23 containing liquid crystalline molecules having cholesteric regularity is applied to the alignment layer 22. A mixture of an ultraviolet-curing nematic liquid crystal made from the above-described polymerizable monomer or oligomer and a chiral agent can be used as the liquid crystalline molecules having cholesteric regularity. Such a solvent as toluene, tetrahydrofuran, xylene, 3-methoxybutyl acetate or cyclohexanone can be used to prepare the cholesteric liquid crystal solution 23. To the cholesteric liquid crystal solution 23, a photopolymerization initiator is added, where any photopolymerization initiator can be used, for instance, Irg 907, Irg 184 or Irg 361 manufactured by Ciba Specialty Chemicals.

As shown in FIG. 3(b), the cholesteric liquid crystal solution 23 applied is heated by a hot plate or the like at a temperature between 50° C. and 90° C. or dried in vacuum to evaporate the solvent contained in the cholesteric liquid crystal solution 23. A liquid crystal layer 24 that is still uncured is thus obtained.

Thereafter, as shown in FIG. 3(c), ultraviolet light is applied, with a low intensity of irradiation, to the uncured liquid crystal layer 24 in the atmosphere; polymerization is initiated by this ultraviolet light applied and the photopolymerization initiator that has been added previously. Liquid crystalline molecules in the uncured liquid crystal layer 24 are thus three-dimensionally crosslinked (polymerized) for curing, and a cured liquid crystal layer 25 is formed as shown in FIG. 3(d). The surface of the uncured liquid crystal layer 24 formed on the alignment layer 22 provided on the glass substrate 21, that is, the surface opposite to the glass-substrate 21-side surface, is exposed to the air, and the radical polymerization reaction caused by the ultraviolet light applied is hindered by oxygen contained in the air (oxygen concentration: approx. 20%). For this reason, liquid crystalline molecules on this surface of the uncured liquid crystal layer 24 are not easily cured as compared with those on the glass-substrate 21-side surface of the uncured liquid crystal layer 24. When ultraviolet light is applied with a low intensity of irradiation, a liquid crystal density gradient occurs between the area in which curing has progressed and the area in which curing has not yet progressed. Due to such a density gradient, the pitch of the helix formed by liquid crystalline molecules in the cured liquid crystal layer 25 is continuously varied in the direction of thickness. The cured liquid crystal layer 25 can thus have a broadened selective reflection wave range.

As shown in FIG. 3(e), the liquid crystal layer (wide-wave-range-covering liquid crystal layer as an original layer) 25 formed on the glass substrate 21 is cut up into a plurality of liquid crystal layers 11, 12, . . . , and 1n, and after separating from the glass substrate 21, any number of these liquid crystal layers are laminated with an adhesive layer (not shown in figure) so that the resulting laminate can have a desired reflectance/transmittance for circularly polarized light. The material for the adhesive layer may be an optical adhesive agent such as NOA 65 or NOA 81 manufactured by NORLAND Products Inc., a pressure-sensitive adhesive sheet, or the like. In the case where the liquid crystal layers are laminated by thermocompression bonding, it is not necessarily to use an adhesive layer.

Thus, a circularly polarizing element 10 is finally obtained, as shown in FIG. 3(f), as a laminate of n number of the liquid crystal layers 11, 12, . . . , and 1n, each covering a wide selective reflection wave range.

According to this embodiment, a circularly polarizing element 10 having a high reflectance for circularly polarized light is obtained by laminating a plurality of liquid crystal layers 11, 12, . . . , and 1n, each being able to selectively reflect circularly polarized light in a wide wave range. Therefore, even a circularly polarizing element 10 that covers a wide selective reflection wave range can be obtained as a laminate of thin liquid crystal layers 11, 12, . . . , and 1n, each having a low reflectance for circularly polarized light. Since a thin liquid crystal layer is advantageous in that the alignment of liquid crystalline molecules can readily be controlled on the formation of the layer, the circularly polarizing element 10 obtained as a laminate of thin liquid crystal layers is excellent in the alignment of liquid crystalline molecules and also in optical properties.

Further, according to this embodiment, a single liquid crystal layer 25 formed on a glass substrate 21 is cut up into a plurality of liquid crystal layers 11, 12, . . . , and 1n to be used to make a circularly polarizing element 10. This means that the liquid crystal layers 11, 12, . . . , and 1n are formed by using one coating liquid under the same conditions. It is therefore possible to control easily and stably the reflectance/transmittance of the circularly polarizing element 10 for circularly polarized light. In addition, it becomes possible to obtain circularly polarizing elements 10 by mass-producing liquid crystal layers 25 as films in advance and cutting up them into liquid crystal layers 11, 12, . . . , and 1n depending upon the desired specifications (the reflectance/transmittance for circularly polarized light, etc.). It is thus possible to save production costs.

Although the above embodiment has been described by taking, as an example, a case where a three-dimensionally crosslinkable, polymerizable monomer or oligomer is used to obtain the liquid crystal layers 11, 12, . . . , and 1n, a liquid crystalline polymer may also be used instead of the polymerizable monomer or oligomer. In this case, an aligned liquid crystalline polymer is cooled to a glassy state to obtain the liquid crystal layers 11, 12, . . . , and 1n. Examples of liquid crystalline polymers herein useful include polymers having mesogen groups, which make the polymers liquid crystalline, in either main or side chains, or in both main and side chains, high-molecular-weight cholesteric liquid crystals having cholesteryl groups in side chains, and liquid crystalline polymers as described in Japanese Laid-Open Patent Publications No. 133810/1997 and No. 293252/1999.

Further, in the aforementioned embodiment, a method in which the helical pitch in each liquid crystal layer 11, 12, . . . , or 1n is continuously varied in the direction of thickness is adopted to obtain a circularly polarizing element 10 adapted to selectively reflecting circularly polarized light in a broadened wave range. Besides this method, it is possible to employ any other method to obtain a circularly polarizing element 10 that can selectively reflect circularly polarized light in a broadened wave range; for example, a method in which a plurality of liquid crystal layers having different helical pitches are laminated. Moreover, to continuously vary, in the direction of thickness, the helical pitch in each liquid crystal layer 11, 12, . . . , or 1n, it is possible to use not only the above-described method but also any of other methods as described in Japanese Laid-Open Patent Publication No. 281814/1994, Japanese Patent Publication No. 3062150, U.S. Pat. No. 5,691,789, and the like.

Furthermore, in the aforementioned embodiment, although the single liquid crystal layer 25 formed on the glass substrate 21 is cut up into a plurality of liquid crystal layers 11, 12, . . . , and 1n, as constituents of the circularly polarizing element 10, it is, of course, possible to separately form liquid crystal layers 11, 12, . . . , and 1n by repeating the steps shown in FIGS. 3(a) to 3(d).

Furthermore, in the aforementioned embodiment, the liquid crystal layers 11, 12, . . . , and 1n in the form of thin films that have been aligned and cured are successively laminated with an adhesive layer. However, the lamination of liquid crystal layers 11, 12, . . . , and 1n can also be conducted in the following manner: a liquid crystal of a liquid crystalline phase is directly applied to a cured liquid crystal layer and then subjected to alignment and curing; this process is repeated to successively laminate a plurality of liquid crystal layers.

In addition, although the above embodiment has been described by taking, as an example, a case where a glass substrate 21 provided with an alignment layer 22 such as a polyimide film is used as an alignment substrate for aligning liquid crystalline molecules in each liquid crystal layer 11, 12, . . . , or 1n, an oriented polymeric film or the like can also be used as the alignment substrate.

EXAMPLES

The present invention will now be described more specifically by referring to the following Examples.

Example 1

A solution of a cholesteric liquid crystal (central wavelength: 570 nm) was firstly prepared. In this preparation, a monomer that was a mixture of an ultraviolet-curing nematic liquid crystal and a chiral agent was used as the cholesteric liquid crystal, and toluene, as a solvent. To this cholesteric liquid crystal solution, Irg 907 manufactured by Ciba Specialty Chemicals was added as a photopolymerization initiator.

Thereafter, the cholesteric liquid crystal solution was applied to the surface of an alignment substrate and heated at 90° C. to evaporate the toluene, as a solvent, to form a liquid crystal layer with a thickness of approximately 5 µm, which was still uncured. A glass substrate provided with a polyimide film, which had been rubbed in advance, was used as the alignment substrate.

Subsequently, the uncured liquid crystal layer was kept warm at a temperature lower than its isotropic phase transition temperature by 10° C. to attain good alignment of liquid crystalline molecules. 0.7 mW/cm² of ultraviolet light (310 nm) was then applied to the liquid crystal layer in the atmosphere for 2 minutes while maintaining the temperature of the alignment substrate at 85° C. There was thus obtained a wide-wave-range-covering liquid crystal layer with a thickness of about 5 µm and a reflectance of approximately 50% for circularly polarized light in the wave range between 400 nm and 650 nm.

This wide-wave-range-covering liquid crystal layer was cut up into a plurality of wide-wave-range-covering liquid crystal layers, and, after separating from the alignment substrate, these liquid crystal layers were laminated to each other with an adhesive layer. An optical adhesive agent, NOA 65 manufactured by NORLAND Products Inc., was used for the adhesive layer.

In the above-described manner, three different circularly polarizing elements (two-, three- and four-layered ones) were produced as laminates of the wide-wave-range-covering liquid crystal layers.

Figure 4:
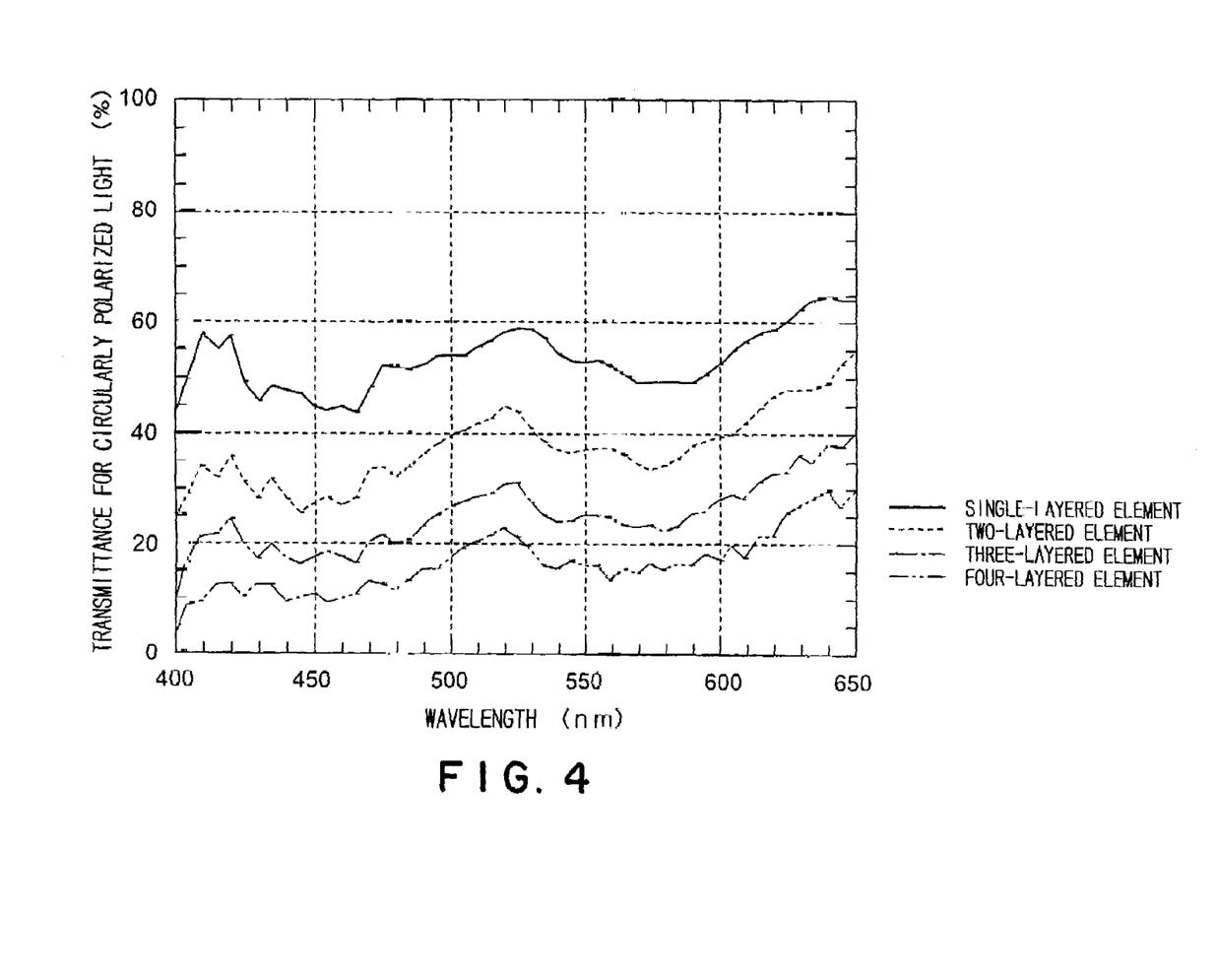
FIG. 4 is a graph showing the spectral properties of the circularly polarizing elements obtained in Example 1.

The spectral properties of the single-layered circularly polarizing element and those of the above three different multi-layered circularly polarizing elements are shown in FIG. 4. As shown in this figure, the transmittance of the single-layered circularly polarizing element for circularly polarized light was approximately 50% (reflectance for circularly polarized light: approx. 50%); that of the two-layered circularly polarizing element for circularly polarized light, approximately 35% (reflectance for circularly polarized light: approx. 65%); that of the three-layered circularly polarizing element for circularly polarized light, approximately 25% (reflectance for circularly polarized light: approx. 75%); and that of the four-layered circularly polarizing element for circularly polarized light, approximately 15% (reflectance for circularly polarized light: approx. 85%). The circularly polarizing elements different in reflectance for circularly polarized light, including those ones having high reflectances for circularly polarized light, were thus easily and stably obtained by laminating a plurality of the wide-wave-range-covering thin liquid crystal layers, each having a low reflectance for circularly polarized light. These circularly polarizing elements were excellent in the alignment of liquid crystalline molecules and also in optical properties.

Example 2

Six solutions of cholesteric liquid crystals different in central wavelength (400–700 nm) were prepared in the same manner as in Example 1.

The solution of the cholesteric liquid crystal covering the shortest wavelength side was applied to an alignment substrate that had been prepared in the same manner as in Example 1, and was then cured. In this example, the treatment for broadening selective reflection wave range conducted in Example 1 was not conducted, and liquid crystal layers respectively covering narrow selective reflection wave ranges were obtained.

Subsequently, another cholesteric liquid crystal solution was directly applied to the cured liquid crystal layer, and was then subjected to alignment and curing. Six liquid crystal layers different in central wavelength were successively laminated in this manner without using an adhesive layer. The thickness of each liquid crystal layer was made between 1.5 µm and 2.5 µm.

There was thus obtained a wide-wave-range-covering liquid crystal layer with a thickness of approximately 9 µm and a transmittance of about 30% for circularly polarized light in the range between 450 nm and 650 nm.

This wide-wave-range-covering liquid crystal layer was cut up into a plurality of wide-wave-range-covering liquid crystal layers, and, after separating from the alignment substrate, four of these wide-wave-range-covering liquid crystal layers were laminated in the same manner as in Example 1 to obtain a four-layered circularly polarizing element.

Figure 5:
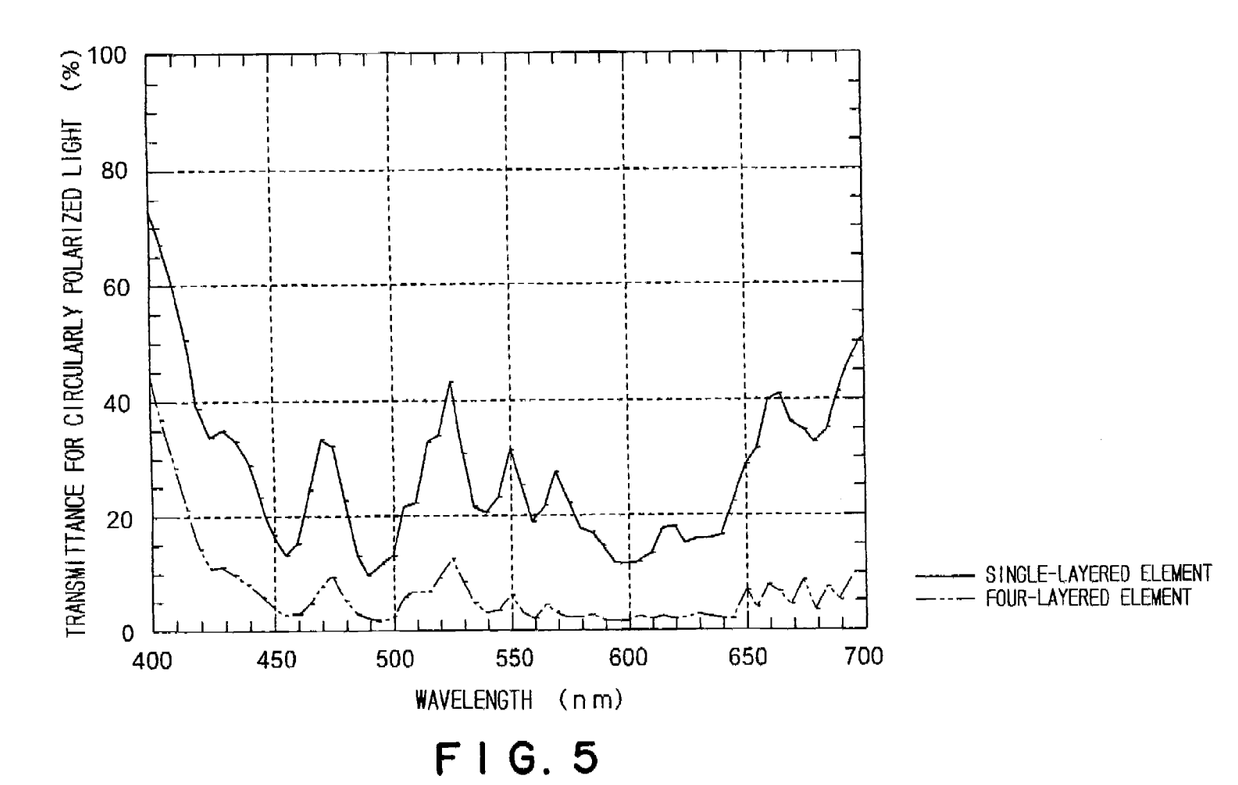
FIG. 5 is a graph showing the spectral properties of the circularly polarizing elements obtained in Example 2.

The spectral properties of the single-layered circularly polarizing element and those of the four-layered circularly polarizing element are shown in FIG. 5. As shown in this figure, the transmittance of the four-layered circularly polarizing element for circularly polarized light was approximately 10% (reflectance for circularly polarized light: approx. 90%). The circularly polarizing element having such a high reflectance for circularly polarized light was thus easily and stably obtained by laminating a plurality of the thin wide-wave-range-covering liquid crystal layers, each having a low reflectance for circularly polarized light. This circularly polarizing element was found to be excellent in the alignment of liquid crystalline molecules and also in optical properties.

What is claimed is:

1. A circularly polarizing element, comprising at least two cholesteric liquid crystal layers that are laminated to each other, wherein:
    each cholesteric liquid crystal layer comprises liquid crystalline molecules having one of a right-handed or a left-handed helical configuration;
    a helical axis of the liquid crystalline molecules in each cholesteric liquid crystal layer extends in a thickness direction of the circularly polarizing element;
    each of the cholesteric liquid crystal layers is formed as a thin film, wherein each of the cholesteric liquid crystal layers having a right-handed helical configuration has a low reflectance for right-handed circularly polarized light, and each of the cholesteric liquid crystal layers having a left-handed helical configuration has a low reflectance for left-handed circularly polarized light;
    each of the cholesteric liquid crystal layers is adapted to selectively reflect circularly polarized light in a wide wave range; and
    the wide wave range of circularly polarized light reflected by each cholesteric liquid crystal layer encompasses a selective reflection wave range common to the wide wave ranges of all of the cholesteric liquid crystal layers.

2. The circularly polarizing element according to claim 1, wherein:
    each cholesteric liquid crystal layer is a single layer; and
    a helical pitch of the helical configuration of the liquid crystalline molecules of each cholesteric liquid crystalline layer varies continuously along a thickness of the layer so that each cholesteric liquid crystal layer can selectively reflect circularly polarized light in a broadened wave range.

3. The circularly polarizing element according to claim 1, wherein:
    each cholesteric liquid crystal layer is a laminate of a plurality of liquid crystal layers each comprising helically-configured liquid crystalline molecules having different helical pitches; and
    each laminate can selectively reflect circularly polarized light in a broadened wave range.

4. The circularly polarizing element according to claim 1, wherein each cholesteric liquid crystal layer can selectively reflect circularly polarized light in a wave range of 200 nm or more.

5. The circularly polarizing element according to claim 1, wherein all of the cholesteric liquid crystal layers are substantially the same.

6. A circularly polarizing element, comprising at least two cholesteric liquid crystal layers that are laminated to each other, wherein:
- each cholesteric liquid crystal layer comprises liquid crystalline molecules having one of a right-handed or a left-handed helical configuration;
- a helical axis of the liquid crystalline molecules in each cholesteric liquid crystal layer extends in a thickness direction of the circularly polarizing element;
- each of the cholesteric liquid crystal layers is formed as a thin film, wherein each of the cholesteric liquid crystal layers having a right-handed helical configuration has a low reflectance for right-handed circularly polarized light, and each of the cholesteric liquid crystal layers having a left-handed helical configuration has a low reflectance for left-handed circularly polarized light;
- a helical pitch of the helical configuration of the liquid crystalline molecules in each cholesteric liquid crystal layer varies so that each cholesteric liquid crystal layer can selectively reflect circularly polarized light in a broadened wave range; and
- the broadened wave range of circularly polarized light reflected by each cholesteric liquid crystal layer encompasses a selective reflection wave range common to the broadened wave ranges of all of the cholesteric liquid crystal layers.

7. The circularly polarizing element according to claim 6, wherein:
- the helical pitch in each cholesteric liquid crystal layer is monotonically varied from short to long; and
- adjacent cholesteric liquid crystal layers are laminated so that the helical pitch in one of the adjacent cholesteric liquid crystal layers varies from short to long in the thickness direction and the helical pitch in the other of the adjacent cholesteric liquid crystal layers varies from long to short in the thickness direction.

8. The circularly polarizing element according to claim 6, wherein:
- the helical pitch in each cholesteric liquid crystal layer is monotonically varied from short to long; and
- adjacent cholesteric liquid crystal layers are laminated so that the helical pitch in each of the adjacent cholesteric liquid crystal layers varies from short to long in the thickness direction.

* * * * *